United States Patent [19] [11] 4,040,111
Lindner et al. [45] Aug. 2, 1977

[54] CAMERA AUTOMATIC EXPOSURE CONTROL APPARATUS

[75] Inventors: Fritz Lindner; Werner Hahn, both of Dresden, Germany

[73] Assignee: VEB Pentacon Dresden, Dresden, Germany

[21] Appl. No.: 587,035

[22] Filed: June 16, 1975

[30] Foreign Application Priority Data

July 5, 1974 Germany .............................. 179713

[51] Int. Cl.$^2$ .............................................. G03B 7/00
[52] U.S. Cl. ...................................... 354/49; 354/59; 354/272
[58] Field of Search ..................... 354/42, 49, 59, 152, 354/154, 272, 270, 273, 274

[56] References Cited

U.S. PATENT DOCUMENTS

| 3,643,575 | 2/1972 | Ono | 354/42 X |
| 3,810,206 | 5/1974 | Sokaguchi et al. | 354/42 |
| 3,827,064 | 7/1974 | Kiyohara et al. | 354/42 X |

FOREIGN PATENT DOCUMENTS 443,887  2/1968  Switzerland .......................... 354/60

Primary Examiner—L. T. Hix
Assistant Examiner—J. A. LaBarre
Attorney, Agent, or Firm—William Anthony Drucker

[57] ABSTRACT

An apparatus for automatic exposure control in a single lens reflex camera including an objective lens having a diaphragm regulating ring and a preselection ring forming part of a preselectable diaphragm means.

A photo-electric receiver controls the exposure.

A light regulating element having an adjusting device for varying the transparency thereof is provided in the light path from the lens and is positioned in front of the photo-electric receiver.

A coupling arrangement is provided in which a receiver diaphragm ring engages the lens diaphragm preselection ring.

First and second lugs are provided on the adjusting device of which the first lug can be coupled with the receiver diaphragm ring.

A spring loaded lug is provided on the diaphragm regulating ring.

A spring loaded unit is also provided having first and second entrainment devices and which can be released by the camera release device, the first entrainment device engaging with the spring loaded lug prior to actuation of the release device and the spring loaded unit moving in the opposite direction to that of the frictional connection of the first lug and the receiver diaphragm ring. The second entrainment device can be coupled with and is situated in the zone of movement of the second lug of the adjusting device at that distance from the second lug which corresponds to the difference between the preselected and the minimum transparency of the light regulating element.

Thus the light regulating element is adjusted by the coupling means from maximum transparency to a reduced transparency corresponding to the diaphragm setting of the preselectable diaphragm prior to exposure and on actuation of the camera release restored by the coupling means to maximum transparency simultaneously with the closure of the lens diaphragm to the preselected value.

5 Claims, 4 Drawing Figures

CAMERA AUTOMATIC EXPOSURE CONTROL APPARATUS

BACKGROUND TO THE INVENTION

The invention relates to an apparatus for automatic exposure control in single-lens reflex cameras.

With cameras of this kind it has been proposed that the illumination of a photo-electric receiver controlling the exposure time should be effected through the objective lens diaphragm as well as through a further light regulating element situated in front of the said photo-electric receiver.

OBJECT OF THE INVENTION

The object of the invention is to provide an apparatus for automatic exposure control in which the reduction of the light admission of the additional light regulating element provided in front of the photo-cell and also its degree of light admission regained at the latest after re-cocking the camera will always correspond to the diaphragm aperture selected at the objective lens and that the magnitude of the change taking place in the light flux on the movement of the lens diaphragm will always correspond to the light flux change taking place in the opposite direction as a result of the light regulating element.

SUMMARY OF THE INVENTION

According to the invention there is provided an apparatus for automatic exposure control in a single lens relfex camera including an objective lens having preselectable diaphragm means; a diaphragm regulating ring and a preselection ring forming part of said preselectable diaphragm means; a photo-electric receiver for controlling the exposure; a light regulating element having an adjusting device for varying the degree of light admission thereof provided in the light path from said lens and positioned in front of said photo-electric receiver; and toothed coupling means whereby movement of the preselection ring to its selected position causes the said light regulating element to be moved in its light restricting sense and when the camera shutter is released the objective lens diaphragm is closed to the selected degree and said light regulating means moves in the opposite sense to the same degree.

In one example the coupling means comprises:

a. a receiver diaphragm ring engaging said lens diaphragm preselection ring;

b. first and second lugs provided on said adjusting device of which first lug can be coupled with the receiver diaphragm ring;

c. a spring loaded lug provided on said diaphragm regulating ring;

d. a spring loaded unit having first and second entrainment devices and which can be released by the camera release device, said first entrainment device engaging with said spring loaded lug prior to actuation of the release device, said spring loaded unit moving in the opposite direction to that of the frictional connection of said first lug and said receiver diaphragm ring, said second entrainment device can be coupled with and is situated in the zone of movement of said second lug of said adjusting device at the distance from said second lug which corresponds to the difference between the preselected and the minimum transparency of the light regulating element, so that said light regulating element being adjusted by said coupling means from maximum transparency to a reduced transparency corresponding to the diaphragm setting of the preselectable diaphragm prior to exposure and on actuation of the camera release restored by said coupling means to said maximum transparency simultaneously with the closure of the lens diaphragm to the preselected value.

In another example said coupling means comprises a gear wheel constantly engaging said adjusting device of said light regulating element and is displaceable by means of the camera release device in opposition to the action of a spring, said gear wheel being coupled alternately with the lens diaphragm preselection ring or with the lens diaphragm regulating ring with corresponding opposite directions of rotation, so that said light regulating element is adjusted by said coupling means from maximum transparency to a reduced transparency corresponding to the diaphragm setting of the preselectable diaphragm prior to exposure and on actuation of the camera release restored by said coupling means to said maximum transparency simultaneously with the closure of the lens diaphragm to the preselected value The apparatus to which the invention relates is very simple to operate and is also suitable, owing to the very moderate output and apparatus involved, for use in miniature cameras.

BRIEF DESCRIPTION OF THE DRAWINGS

The invention will be explained below by reference to examples, with reference to the accompanying drawings in which.

DESCRIPTION OF PREFERRED EMBODIMENTS

Figure 1:
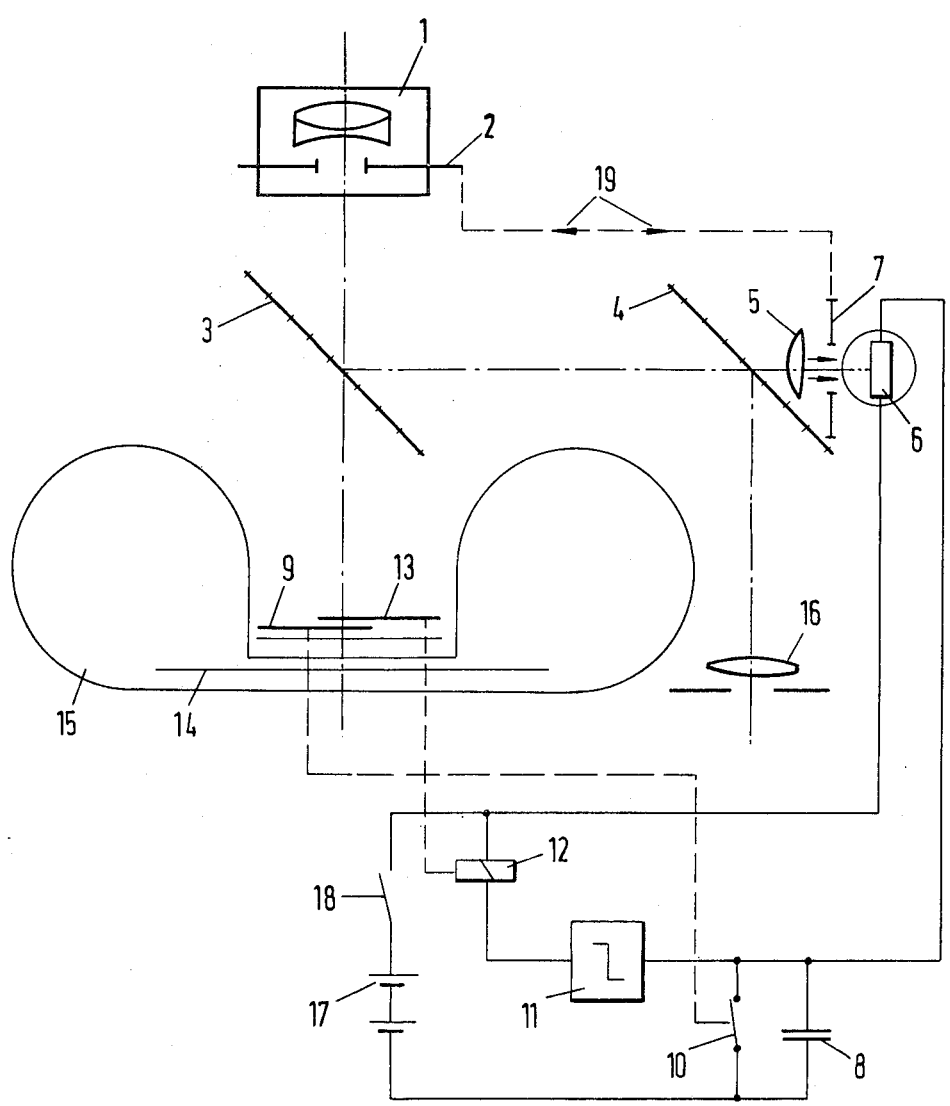
FIG. 1 shows the exposure time control system disclosed in outline.

As shown in FIG. 1 the system includes a diaphragm 2, behind which is provided a fixed partly transparent mirror 3, is situated in the path of the taking rays of the lens 1. In the reflected path of the rays is a further partly transparent mirror 4, an optical system 5 and, in front of a photoconductive cell 6, a receiver diaphragm 7 coupled to the diaphragm 2. The coupling movement of the two diaphragms in opposite directions to each other is indicated by the arrows 19. The photo-cell 6 of linear characteristics forms in conjunction with a capacitor 8 an RC element which, in the known manner, after a switch 10 coupled with a first shutter element 9 has been opened, controls the movement of a follow-up shutter element 13 via a trigger circuit 11 and an electro-magnet 12 which is provided with a battery 17 and switch 18. When the shutter is operated light falls onto the film 14 situated in the cassette 15. The image is observed through the viewfinder eyepiece 16.

The method of operation is as follows:

Before the camera release is actuated the receiver diaphragm 7 is stopped down from maximum transparency, to a reduced transparency corresponding to the diaphragm value to which the lens diaphragm preselection ring, not shown in the drawing, has been set. In this process prior to exposure the diaphragm 2 of the lens is completely open, in order to ensure a bright viewfinder image. When the release is actuated the diaphragm 2 is stopped-down to the preselected value and due to the coupling the receiver diaphragm 7 is at the same time opened up to the maximum diameter. The two diaphragms pass in opposite directions to each other through the same number of diaphragm stages, so that the illumination intensity on the photo-cell 6 remains constant and any inertia of the latter thus cannot exert any erroneous exposure influences. Owing to the fixed partly transparent mirror 3 this illumination is maintained even during the exposure phase, resulting in an accurate exposure time forming process.

The receiver diaphragm 7 can also take the form of filter foils of which the densities are appropriately variable or by polarization filters rotatable in respect of one another. Furthermore, the input of film speeds or correction factors can be included in the correlation of the diaphragms 2 and 7, in order to influence the exposure time as desired. In this case, it is true that the level of the illumination intensity on the photo-cell 6 will be altered, but in the release process it will once again remain constant.

Figure 2:
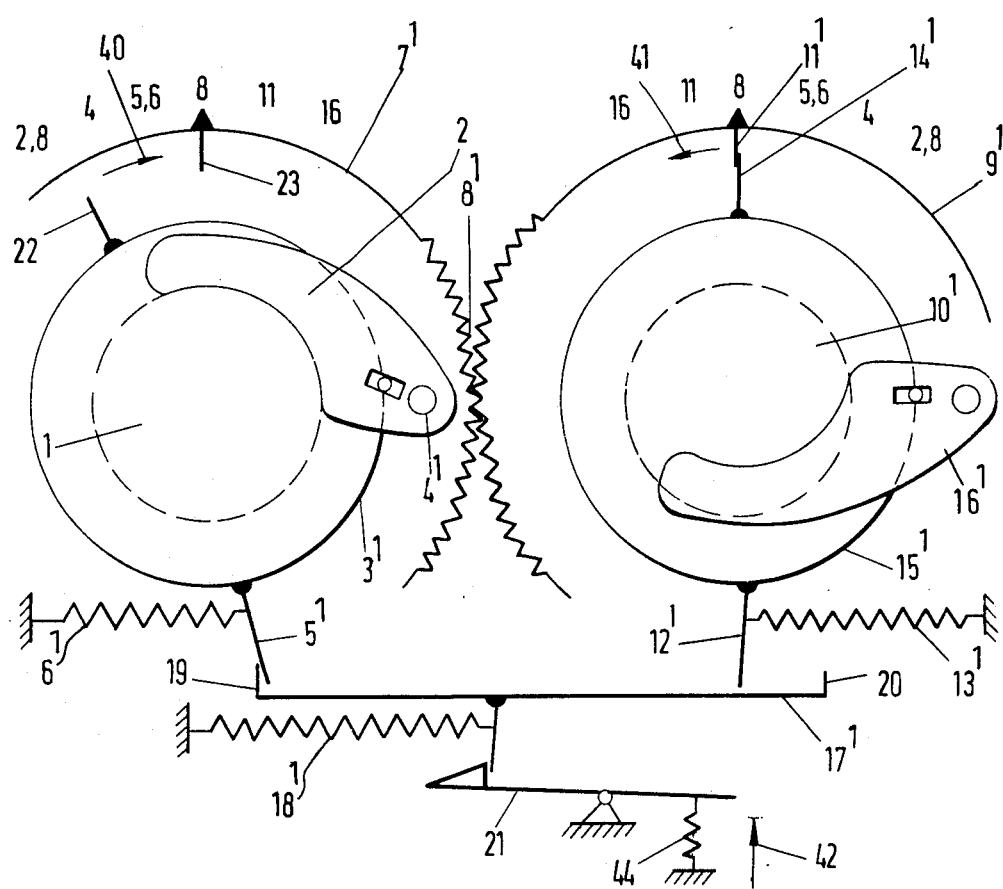
FIG. 2 shows the correlation between the driving elements for diaphragm selection, lens diaphragm and receiver diaphragm according to the invention.

An embodiment of the coupling system is shown in FIG. 2 in which the aperture diaphragm plane of an objective lens 1 contains a system of blades 2 which is moved around a fixed bearing point $4^1$ by means of a diaphragm adjusting ring $3^1$. A driving spring $6^1$ is mounted on a lug $5^1$ of the diaphragm adjusting ring 3. A lens diaphragm preselection ring $7^1$ is coupled, by a gear-type coupling $8^1$, with a receiver diaphragm ring $9^1$ of an illumination lens $10^1$ of a photo-conductive cell not shown in the drawing. Under the action of a spring $13^1$ acting on a lug $12^1$, a lug $14^1$ of an adjusting ring $15^1$ for a receiver diaphragm blade system $16^1$, rests against a stop $11^1$ of the receiver diaphragm ring $9^1$. A spring-loaded unit $17^1$ which is subject to the action of a traction spring $18^1$ is provided with entrainment devices 19 and 20 and may form part of a mirror gearing not shown in the drawing and can be released by means of a pivoted detent lever 21 held by a spring 44.

The adjusting ring 3 is provided with an arm 22 and the preselection ring 7 with a stop 23.

The method of operation is as follows:

For the preselection of the diaphragms of the objective lens to a value of $f.8$, for example, the preselection ring $7^1$ is rotated in the direction shown by the arrow 40 until the stop 23 for the corresponding diaphragm aperture on the diaphragm scale is opposite to this value. The blade system 2 remains open in this process. This selection is transferred via the gear coupling $8^1$ in the direction shown by the arrow 41 to the ring $9^1$ and finally to the adjusting ring $15^1$ under the action of a spring $13^1$, so that the transparency of the diaphragm system $16^1$ is reduced to the preselected diaphragm value. The distance between the lug $12^1$ and the entrainment device 20, corresponds to the difference in distance between the diaphragm values $f.8$ and $f.16$. When the detent lever 21 is moved in the direction shown by the arrow 42 the spring-loaded unit $17^1$ moves under the action of the spring $18^1$ and following behind it, as a result of the spring $6^1$, the diaphragm adjusting ring $3^1$ likewise moves over its traject, until the arm 22 reaches the stop 23.

At this moment the lug $12^1$ has been moved by the entrainment device 20 to the distance required to ensure that the diaphragm system 16 has been opened from the preselected aperture $f = 8$, in the first instance, to $f = 5.6$. As may be clearly seen from FIG. 2, the movement of the spring-loaded unit $17^1$ is not yet thereby ended. After the arm 22 has reached the stop 23, the entrainment device 19 moves away from the lug $5^1$ and the spring-loaded unit $17^1$ continues its movement under the action of the spring $18^1$. During this continued movement the lug $12^1$ is still further pivoted by the entrainment device 20 and the adjusting ring $15^1$ is thereby rotated until the diaphragm system $16^1$ has reached its maximum light permeability ($f = 2.8$).

No further movement of the adjusting ring $15^1$ is possible. As the adjusting ring 15 is thus locked in position, the lug $12^1$ now acts as a stop for the entrainment device 20. Only now is the movement of the spring-loaded unit $17^1$ terminated. As a result of this sequence of functions, taking place within a very short time, the diaphragm system $2^1$ has been closed (stopped down) in the desired manner from $f = 2.8$ to $f = 8$, while the diaphragm system $16^1$ has been opened from diaphragm aperture $f = 8$ to $f = 2.8$.

A corresponding sequence of functions is obtained with any other diaphragm aperture selection.

The illumination of the photo-cell thus remains constant during the closing movement of the blade system 2, so that the inertia of the receiver cannot affect the operation of forming the exposure time, which now commences in the known manner. The film exposure takes place, for example, through a fixed partly transparent mirror. When the camera is re-cocked or as a result of the return movement of the mirror gearing, the spring-loaded unit $17^1$ and thus the adjusting rings $3^1$ and $15^1$ are returned to the initial position, in which the coupling between the lug $12^1$ and the entrainment device 20 is released while that between the lug $14^1$ and the stop $11^1$ is brought about again.

Figure 3:
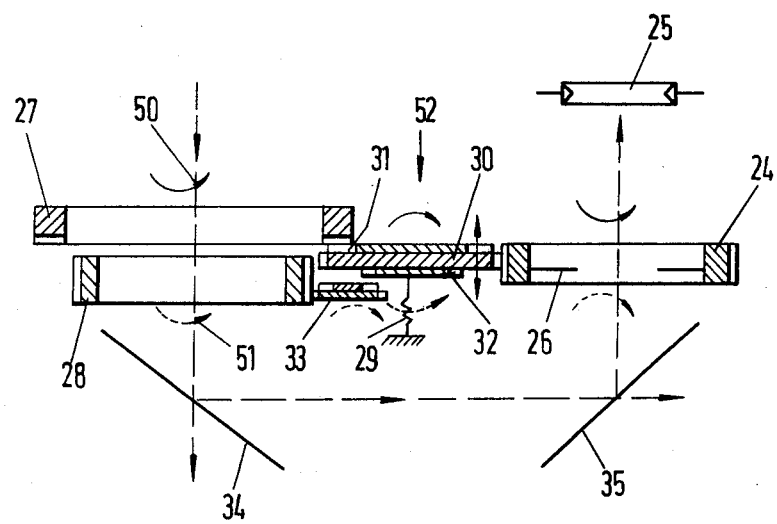
FIG. 3 shows a variant of the correlation between the driving elements.
Figure 4:
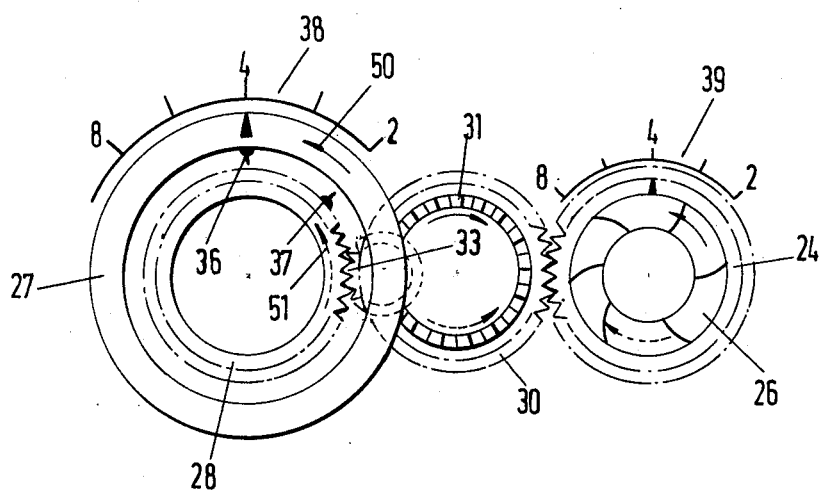
FIG. 4 plan view corresponding to the arrangement of FIG. 3.

An alternative coupling system is shown in FIGS. 3 and 4 in which an adjusting ring 24 for a diaphragm 26 situated in front of a photo-cell 25 can be coupled on the one hand with a lockable lens diaphragm preselection ring 27 and on the other with a follow-up adjusting ring 28 for the objective lens diaphragm. The coupling is effected alternately via a gear wheel 30 subject to the action of a pressure spring 29 and displaceable by the camera release device (not shown) and provided on its flat surfaces with further systems of teeth 31 and 32 or with friction coatings. An intermediate wheel 33, likewise having teeth on its upper flat side, engages the adjusting ring 28. Fixed semi-transparent mirrors 34 and 35 are provided in the ray paths. The selection ring 27 is provided with a stop 36 and the adjusting ring 28 with a stop 37. Fixed diaphragm scales 38 and 39 are provided for rings 27 and 24 respectively.

The method of operation is as follows:

When the diaphragm is to be selected the selection ring 27 is rotated in the direction of the fully drawn arrow 50, e.g. to $f.4$ and secured in this position. Via the coupling provided between the preselection ring 27 and the system of teeth 31 this movement is transferred simultaneously to the adjusting ring 24 which moves in the same direction as the preselection ring 27, so that the receiver diaphragm 26 is closed to diaphragm $f.4$. The viewfinder image passing through the mirror 35 remains bright in this process. When the release device is actuated in the direction shown by arrow 52 the gear wheel 30 is displaced in opposition to the pressure spring 29. The coupling which has prevailed up to this moment is thus released, in addition to which, via the system of teeth 32 and also the intermediate wheel, which reverses the direction of rotation and is likewise provided with teeth on its upper flat side, the coupling between the adjusting ring 28 and the adjusting ring 24 is engaged. As the release device continues to be operated, the adjusting ring 28 is moved under the action of the spring or in opposition thereto, and is caused to follow the preselection ring 27 as far as the stop 36, in the direction of the arrow 51 shown in a broken line, the adjusting ring 24 is moved in the opposite direction, in accordance with the directions of rotation shown in broken lines. In these combined movements, therefore, the lens diaphragm, which is not shown, is closed from diaphragm $f.2$ to diaghragm $f.4$, the receiver diaphragm 26 being opened from diaphragm $f.4$ to diaphragm $f.2$. The quantity of light encountering the photo-cell 25 thus once again remains constant. The said photo-cell, after the opening of the shutter, and in the known manner, now controls the opening time of the shutter, behind which is situated the film exposed by the partly transparent mirror 34. If the adjusting ring 28 and thus the lens diaphragm, controlled by a shutter part of the camera or during the first part of the return movement of the release device, returns to the fully opened position, under the effect of the spring, then the receiver diaphragm 26, via the coupling still prevailing, once again closes, in the opposite direction, to the preselected diaphragm value $f.4$. If the actuation of the release device finally ceases, the gear wheel 30 returns to the initial position, in which the coupling between the adjusting ring 24 and the preselection ring 27 once again prevails. The initial conditions are thus restored. The diaphragm 26 could be replaced by some other known type of light regulating means, while the intermediate wheel 33 can be replaced by an extending arm mounted in a fixed position on the diaphragm adjusting ring 28 and engaging the system of teeth 32 by its toothed end on the side facing towards the adjusting ring 24.

What we claim is:

1. An apparatus for automatic exposure control in a single lens reflex camera including:
    an objective lens having preselectable diaphragm means;
    a diaphragm regulating ring and a preselection ring forming part of said preselectable diaphragm means;
    a photo-electric receiver for controlling the exposure;
    a light regulating element having an adjusting device for varying the degree of light admission thereof provided in the light path from said lens and positioned in front of said photo-electric receiver; and coupling means comprising:
    a. a receiver diaphragm ring engaging said lens diaphragm preselection ring;
    b. first and second lugs provided on said adjusting device of which said first lug can be coupled with the receiver diaphragm ring;
    c. a spring loaded lug provided on said diaphragm regulating ring;
    d. a spring loaded unit having first and second entrainment devices and which can be released by the camera release device, said first entrainment device engaging with said spring loaded lug prior to actuation of the release device, said second entrainment device can be coupled with and is situated in the zone of movement of said second lug of said adjusting device at that distance from said second lug which corresponds to the difference between the preselected and the minimum light admission of the light regulating element, so that said light regulating element is adjusted by said coupling means from maximum light admission to a reduced light admission corresponding to the diaphragm setting of the preselectable diaphragm prior to exposure and on actuation of the camera release restored by said coupling means to said maximum light admission simultaneously with the closure of the lens diaphragm to the preselected value.

2. An apparatus for automatic exposure control in a single lens reflex camera including:
    an objective lens having preselectable diaphragm means;
    a diaphragm regulating ring and a preselection ring forming part of said preselectable diaphragm means;
    a photo-electric receiver for controlling the exposure;
    a light regulating element having an adjusting device for varying the light admission thereof provided in the light path from said lens and positioned in front of said photo-electric receiver; and coupling means comprising:
    a gear wheel constantly engaging said adjusting device of said light regulating element and is displaceable by means of the camera release device in opposition to the action of a spring, said gear wheel being coupled alternately with the lens diaphragm preselection ring or with the lens diaphragm regulating ring with corresponding opposite directions of rotation, so that said light regulating element is adjusted by said coupling means from maximum light admission to a reduced light admission corresponding to the diaphragm setting of the preselectable diaphragm prior to exposure and on actuation of the camera release restored by said coupling means to said maximum light admission simultaneously with the closure of the lens diaphragm to the preselected value.

3. An apparatus according to claim 2 wherein said gear wheel is connected alternately with said adjusting ring by means of an intermediate wheel.

4. An apparatus according to claim 3 wherein the gear wheel is additionally provided, on its two flat surfaces, with systems of teeth, which are connected alternately with the preselection ring or with the said diaphragm adjusting ring.

5. An apparatus for automatic exposure control in a single lens reflex camera including
    an exposure shutter;
    a shutter release element;
    an objective lens;
    a first light regulating means ($3^1$ and 2 or 28) controlling light admission through said objective lens;
    a toothed preselection element ($7^1$, 27) controlling said first light regulating means;
    a photo-electric receiver for controlling the exposure;
    an optical device associated with said photo-electric receiver;
    means for directing light from the objective lens through the said optical device to the photo-electric receiver;
    a second light regulating means ($15^1$, $16^1$ or 24) controlling light passing from said optical device to the photo-electric receiver;
    a first abutment (23, 36) movable by said preselection element to its preselected position;

a second abutment (22, 37) on said first light regulating means movable into engagement with said first abutment on release of the shutter release element;

operating means for driving the second light controlling means in its light restricting direction when the preselection element is moved to its selected position, said operating means including teeth engaging the teeth on the preselection element;

means (61) for driving said first regulating means in the light restricting direction on release of the shutter release element; and driving means (20, 12$^1$ or 33, 32) for driving the second light regulating means in the direction opposite to that of the first light regulating means and to an equal degree after release of the shutter release element.

* * * * *